No. 772,862. PATENTED OCT. 18, 1904.
K. BIRKELAND.
PROCESS OF ELECTRICALLY TREATING GASES.
APPLICATION FILED APR. 2, 1904.
NO MODEL.
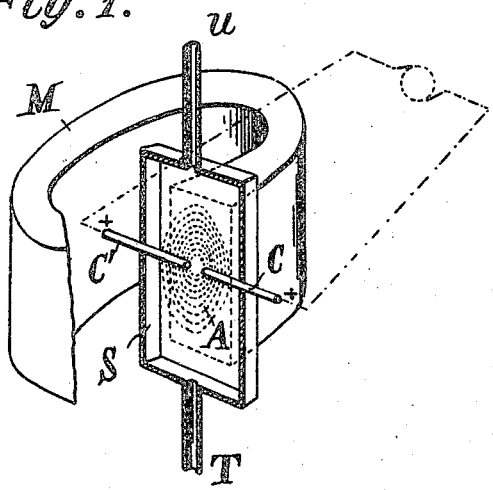
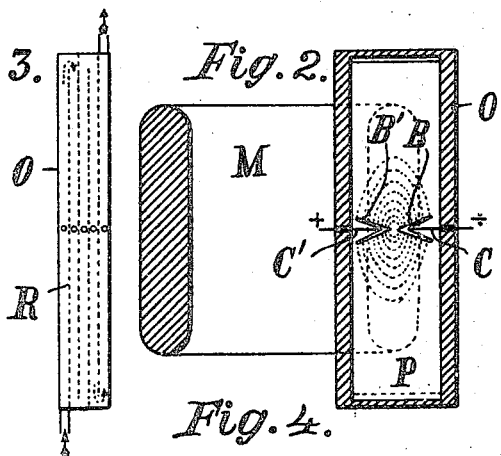
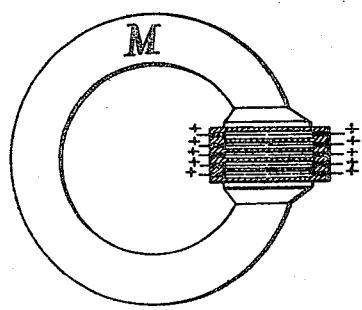

No. 772,862. Patented October 18, 1904.

UNITED STATES PATENT OFFICE.

KRISTIAN BIRKELAND, OF CHRISTIANIA, NORWAY.

PROCESS OF ELECTRICALLY TREATING GASES.

SPECIFICATION forming part of Letters Patent No. 772,862, dated October 18, 1904.

Original application filed June 15, 1903, Serial No. 161,616. Divided and this application filed April 2, 1904. Serial No. 201,267.

(No specimens.)

*To all whom it may concern:*

Be it known that I, KRISTIAN BIRKELAND, a subject of the King of Sweden and Norway, residing at Christiania, Norway, have invented certain new and useful Improvements in Processes of Electrically Treating Gases; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to a process of treating gases or gas mixtures at high temperatures for the purpose of causing chemical reactions in the same. Experiments have been made to produce the high temperatures necessary for such processes—for instance, the nitrification of air by means of electric arcs established within the gas; but this method has proven a commercial failure, for the reason that the energy consumed by an ordinary electric arc is too great relatively to the units of heat utilized in the chemical process by the gases treated. It has not, therefore, been possible up to this date to utilize electric energy in a single powerful arc for the production, for instance, of nitric compounds from the atmosphere in an economical manner. Experiments are also known by which comparatively great quantities of electrical energy have been distributed among a very large number of thin electric arcs, each representing only a very small amount of energy and current strength in order to obtain a high efficiency and better economical results.

My invention has for its object a process whereby the efficiency of an electric arc at a single set of electrodes for causing chemical reactions at temperatures of about 1,500° to 3,000° centigrade is enormously increased.

My invention is based upon the fact that electrical discharges produced between electrodes placed within a magnetic field may be dispersed by the action of the magnets. By my experiments I have found that an electric arc of high or low tension may be dilated or spread into a large permanent flame having the shape of a sheet or a disk of a volume several hundred times as large as a regular or primary arc of the same energy when the electrodes are placed in a suitable manner in a powerful magnetic field—for instance, between the poles of a magnet and transverse to the flux of said field. In this way I am able to transform a great part of the electrical energy into heat capable of being absorbed by certain gases, as chemical energy under conditions which are attended by valuable chemical reactions. This is due to the fact that the efficiency of a flame in endothermical chemical processes is a function of the ratio between the volume and the temperature of the flame. By my process I am able to have furnaces at continuous work with several hundred kilowatts at each flame, the heat being economically utilized, a result which was not heretofore possible unless the energy employed for each arc was only very small.

In carrying out my process I may make use of a great variety of apparatus, and in my application, Serial No. 161,616, filed June 15, 1903, of which this is a divisional application, I have described several forms of such apparatus. For the purpose of explaining my process more clearly I shall, however, describe one form of apparatus, which is shown in the annexed drawings.

In the drawings, Figure 1 is a perspective diagrammatic view, partly in section, illustrating the main features of an apparatus for carrying out my invention; Fig. 2, a vertical section through an apparatus having a number of consecutive chambers arranged between the poles of a magnet; Fig. 3, a vertical section at right angles to Fig. 2 through the said chambers, and Fig. 4 a horizontal section through the same.

In Fig. 1, M represents an electromagnet, (one pole of which is broken away,) and C C' electrodes which are placed in the field between the two poles of the magnet M. These electrodes are inserted in an electrical circuit, as indicated, and are inclosed within a housing or channel S, of fireproof material, placed between the poles of the magnet. This housing has an air or gas inlet at T and an outlet at U. With a suitable distance between the points of the electrodes and a suitable current as well on the electrodes as on the magnets there will be formed a dispersed arc, as indicated by the curves A, the arc being in the shape of a permanent sheet or disk at right angles to the lines of force of the magnetic field. If currents of high voltage—for instance, five thousand volts—are used, I have found it suitable to place the electrodes at a fixed distance of some millimeters apart. As explained in my aforesaid application of same date I may also make use of electrodes having rapid periodic movements. In this case I may also make use of low-tension current. The air or gas coming in at T will pass through the flame in the direction of its plane and will thereby be exposed to a very energetic action of long duration. Figs. 2, 3, and 4 show a multiple-chamber arrangement for this purpose. M represents an annular electromagnet. Instead of an electromagnet a compound permanent magnet may be used. Between the poles of the electromagnet is placed a tubular housing O, which is divided into a series of vertical channels P by partitions R, which alternately extend to the top and the bottom plates and alternately leave a space open between their ends and said plates, so that a zigzag channel is formed through which air is passed. (See Figs. 2 and 3.) The housing and the partitions within the same should wholly or partly be made of insulating and fireproof material. Within each of said channels P are placed electrodes C C', which may be provided with horns B B', formed out of strips of platinum, fixed so as to form an angle with the electrode at opposite sides, whereby the size of the arc may be increased. When a current of very high voltage is used, the current may be sent partly or wholly in series through the whole set of electrodes. The air may be passed either directly in parallel through all the flat channels or wholly or partly in series through the same, as shown in Fig. 1 of the drawings, the air passing in this case upward past the first arc, downward past the second, upward past the third, and so on. In this way the same quantity of air will make contact with a great number of arcs. If it is desired to bring the gases in contact with a still greater number of arcs, a plurality of such arc systems having each their separate electromagnet may be disposed with suitable intervals in vertical or horizontal rows.

Having thus fully described my invention, what I claim as new, and desire to secure by Letters Patent of the United States, is—

1. The process which consists in establishing an electric arc, creating a magnetic field adapted to disperse or spread said arc and passing a current of gas or gases past and in contact with said arc.

2. The process which consists in establishing an electric arc in a magnetic field and transverse to the flux of the same and passing a current of gas to be treated past said arc and in contact with the same.

3. The process which consists in establishing an electric arc in a substantially uniform magnetic field and transverse to the flux of the same, and passing a current of gas to be treated past said arc and in contact with the same.

4. The process of causing chemical reaction in a compound or mixture of gases, which consists in subjecting such a compound or mixture to the action of an electric arc in a magnetic field.

5. The process of causing chemical reaction in a compound or mixture of gases, which consists in subjecting such a compound or mixture to the action of an electric arc in a substantially uniform magnetic field.

6. The process of causing chemical reaction in a compound or mixture of gases, which consists in establishing an arc in a magnetic field and transverse to the flux of the same, and passing a current of the compound or mixture past said arc and in contact with the same.

7. The process which consists in establishing an electric arc, spreading said arc by a magnetic field into the form of a sheet, and passing a current of the gas to be treated in a direction parallel to the surface of said sheet and in contact therewith.

8. The process of producing compounds of nitrogen from gases containing nitrogen, which consists in establishing an electric arc in a magnetic field, subjecting said gases to the action of said arc, and then removing the resultant compounds of nitrogen.

9. The process of producing nitrogen oxids from atmospheric air, which consists in subjecting said air to the simultaneous action of an electric arc and a magnetic field and then removing the nitrogen oxids from the remaining products.

In testimony whereof I affix my signature to this specification in the presence of two witnesses.

KRISTIAN BIRKELAND.

Witnesses:
 AUG. OLSEN,
 HENRY BORDEWICH.